US009739381B2

(12) United States Patent
Bouvry et al.

(10) Patent No.: US 9,739,381 B2
(45) Date of Patent: Aug. 22, 2017

(54) MECHANICALLY RETAINED VALVE SEAT

(71) Applicant: EMERSON PROCESS MANAGEMENT REGULATOR TECHNOLOGIES, INC., McKinney, TX (US)

(72) Inventors: Michel Bouvry, Champhol (FR); Daniel Coestesquis, Chartres (FR); Harold J. Mckinney, Durant, OK (US); Daniel G. Roper, Lucas, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 63 days.

(21) Appl. No.: 14/530,194

(22) Filed: Oct. 31, 2014

(65) Prior Publication Data
US 2015/0123024 A1    May 7, 2015

Related U.S. Application Data

(60) Provisional application No. 61/899,105, filed on Nov. 1, 2013.

(51) Int. Cl.
*F16K 1/46*  (2006.01)
*G05D 16/06*  (2006.01)
(52) U.S. Cl.
CPC ........... *F16K 1/46* (2013.01); *G05D 16/0638* (2013.01)
(58) Field of Classification Search
CPC ... F16K 1/46; F16K 1/36; F16K 47/04; F16K 31/1262; G05D 16/0638

USPC .......... 251/357, 332–333, 337, 282
See application file for complete search history.

(56) References Cited

U.S. PATENT DOCUMENTS

| | | | | |
|---|---|---|---|---|
| 1,627,299 | A | * 5/1927 | Wilson | ...... F16K 1/46 251/357 |
| 2008/0029171 | A1 | * 2/2008 | Weyer | ...... F16K 31/1262 137/625.33 |
| 2009/0065073 | A1 | 3/2009 | Davis | |
| 2010/0269925 | A1 | 10/2010 | Roper et al. | |
| 2013/0000756 | A1 | 1/2013 | Griffin, Jr. et al. | |

FOREIGN PATENT DOCUMENTS

CH              699704 A1 * 4/2010  ............... F16K 1/34

OTHER PUBLICATIONS

International Search Report for International application No. PCT/US2014/063625, mailed Mar. 11, 2015.

(Continued)

*Primary Examiner* — Marina Tietjen
(74) *Attorney, Agent, or Firm* — Marshall, Gerstein & Borun LLP

(57) ABSTRACT

A sealing disk mounting assembly for a regulator includes a mounting member adapted to be operatively attached to a tubular member of a control member assembly of a regulator, a disk holder operatively attached to the mounting member, and an annular sealing disk disposed in an annular channel that is formed between the mounting member and the disk holder. The annular sealing disk is mechanically retained between the mounting member and the disk holder by compressive forces.

18 Claims, 3 Drawing Sheets

(56) References Cited

OTHER PUBLICATIONS

Written Opinion for International application No. PCT/US2014/063625, mailed Mar. 11, 2015.
International Preliminary Report on Patentability for International application No. PCT/US2014/063625, dated May 3, 2016.
Examination Report for European Application No. 14796997.6, dated Mar. 13, 2017.

* cited by examiner

MECHANICALLY RETAINED VALVE SEAT

FIELD OF THE DISCLOSURE

The present disclosure generally relates to fluid control devices and, more particularly, to control member assemblies for fluid control devices.

BACKGROUND

Fluid control devices generally include control valves and regulators. These control devices are usually installed in a fluid process control system such as chemical treatment systems, natural gas delivery systems, etc., for controlling the flow of a fluid through the system. Each control device defines a fluid flow-path and includes a control member for adjusting a dimension of the flow-path. For example, FIG. 1 depicts a known regulator assembly 10 including a valve body 12 and an actuator 14. The valve body 12 defines a flow-path 16 having a narrowed portion or throat 18. The regulator assembly 10 illustrated in FIG. 1 is configured in a flow-up configuration. In other words, fluid flows upward, through the throat 18 as illustrated in FIG. 1.

The actuator 14 includes an upper actuator casing 20, a lower actuator casing 22, and a control member assembly 24. The control member assembly 24 is disposed within the upper and lower actuator casings 20, 22 and is adapted for bi-directional displacement in response to changes in pressure across the regulator assembly 10. Additionally, as is illustrated in FIG. 1, the regulator assembly 10 includes a seat ring 26 disposed in the throat 18 of the valve body 12. The control member assembly 24 cooperates with the seat ring 26 to control the flow of fluid through the throat 18. When the outlet pressure is high, a sealing surface 28 of the control member assembly 24 may sealingly engage the seat ring 26 and close the throat 18. This prevents the flow of fluid through the regulator 10.

The seat ring 26 depicted in FIG. 1 further includes a rounded or tapered surface 27. The rounded or tapered surface 27 serves to streamline the flow of the fluid through an orifice 29. As fluid flows through the valve body 12, it flows from the left of the valve body 12, as depicted in FIG. 1 and up through the throat 18 via the orifice 29 in the seat ring 26. Then, the fluid deflects off a lower surface of the control member 24 including the sealing surface 28, and out to the right of the valve body 12 of FIG. 1.

FIG. 1 illustrates a regulator assembly 10 having a known control member assembly 24. Generally speaking, the control member assembly 24 includes the sealing surface 28 that engages a seating surface 31 of the seat ring 26 when the control member assembly 24 is in a closed position, thereby preventing the fluid from flowing through the valve body 12. More specifically, the control member assembly 24 further includes a tubular member 30 and a mounting subassembly 32. The tubular member 30 includes an upper end 30a and a lower end 30b that is open and accommodates the mounting subassembly 32. The mounting subassembly 32 further includes a mounting member 34, a plug or a disk holder 36 and a sealing disk 38 having the sealing surface 28.

The disk holder 36 includes the cylindrical body 37 having a flange 42 extending radially therefrom. The flange 42 includes a top surface 44 that abuts a bottom surface of the mounting member 34 (FIG. 1) and a bottom surface 46 that includes an annular recess 48 for receiving the sealing disk 38 having the sealing surface 28. The sealing disk 38 may include a generally ring-shaped disk made of a lower strength moldable resilient material, which is bonded to the disk holder 36 with an adhesive.

Generally speaking, lower strength moldable resilient sealing disks 38 degrade under high pressure drops and low flow conditions that are created at the interface of the sealing disk 38 and the seat ring 26. As a result, more robust materials may be used to form the sealing disk 38 for high pressure drops and low flow conditions. However, these more robust materials often lack sufficient bonding strength at high pressure drops and low flows, resulting in bonding failure between the disk holder 36 and the sealing disk 38, and, therefore, failure of the sealing disk 38 and the control member assembly 24 in general. More specifically, fluid impingement on the sealing disk 38 causes the bonding between the sealing disk 38 and the disk holder 36 to fail and/or may cause the sealing disk 38 to tear. Additionally, these more robust materials are more difficult to mold.

DETAILED DESCRIPTION OF THE DISCLOSURE

Generally speaking, the sealing disk mounting assemblies described herein mechanically retain a sealing disk through compression. While adhesives are not required in the sealing disk mounting assemblies described herein, adhesives may be used if desired. The sealing disks may be retained through axial compression, radial compression, or a combination of both. By mechanically retaining the sealing disk in the mounting assembly, the disclosed mounting assemblies facilitate the use sealing disks made of harder, more robust materials, which may have reduced bonding qualities. As a result, the disclosed sealing disk mounting assemblies solve the problem of de-bonding of sealing disks in high pressure drop, low flow operations.

Figure 1:
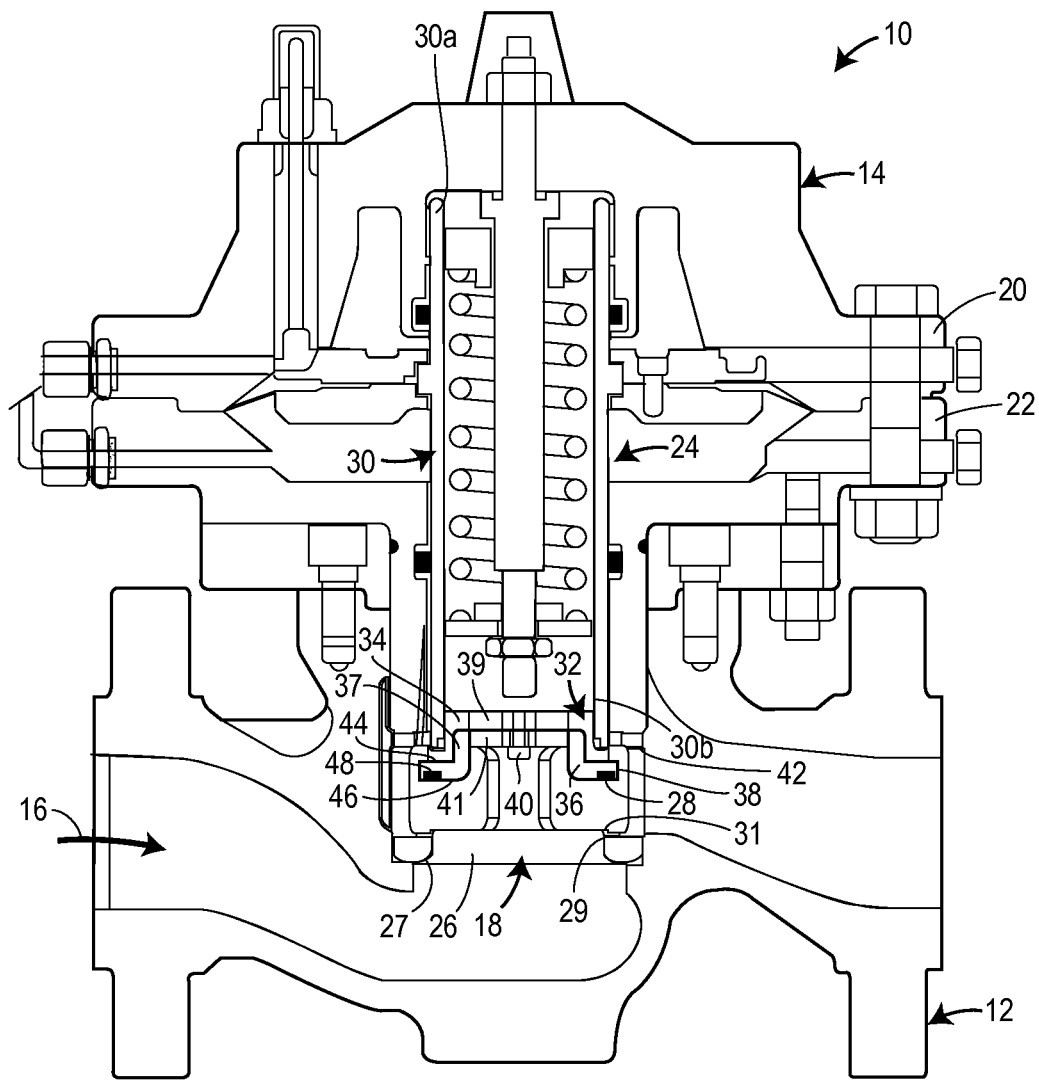
FIG. 1 is a cross-sectional side view of a regulator assembly including a known valve plug and sealing disk.
Figure 2:
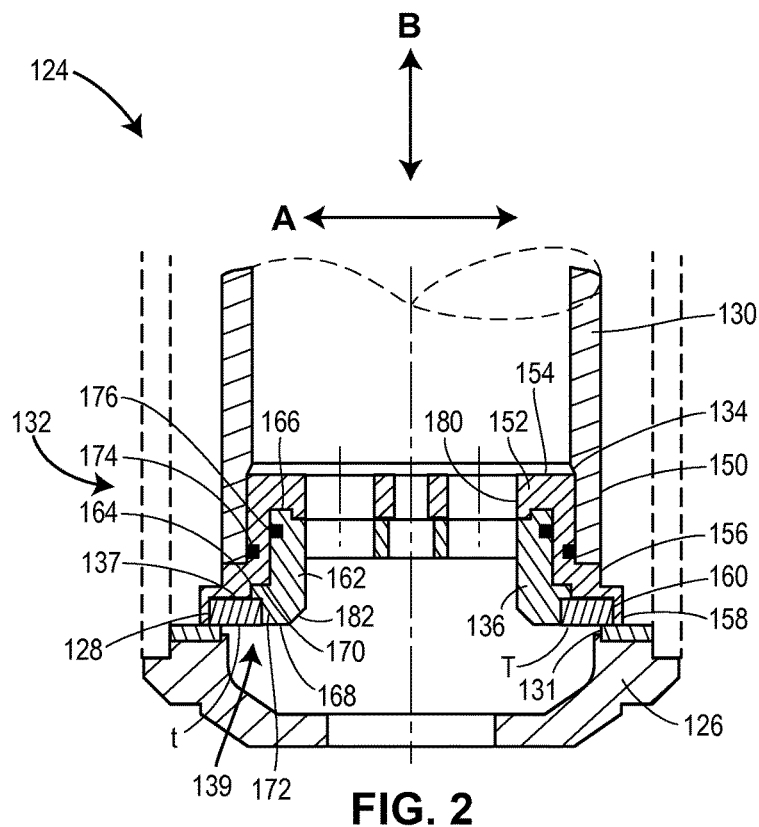
FIG. 2 is cross-sectional side view of a mechanical retention sealing disk mounting assembly constructed in accordance with the teachings of the disclosure.

Referring to FIG. 2, a first embodiment of a sealing disk mounting assembly 132 is operatively attached to a tubular member 130 of a control member assembly 124. The sealing disk mounting assembly 132 may be attached to the tubular member 130 by, for example, an interference fit, welds, a threaded connection, fasteners, or any other method of attaching one element to another. The sealing disk mounting assembly 132 includes a mounting member 134, which extends into a hollow bore of the tubular member 130, and a disk holder 136, which is attached to the mounting member 134 so that the mounting member is disposed between the disk holder 136 and the tubular member 130. The disk holder 136 and the mounting member 134 form a recessed annular channel 137 therebetween at a distal end 139 of the sealing disk mounting assembly 132. An annular sealing disk 128 is mechanically retained within the recessed annular channel 137.

The annular sealing disk 128 may be mechanically compressed in a radial direction A in the embodiment of FIG. 2. This radial compression prevents the annular sealing disk 128 from becoming dislodged from the disk holder 136 due to fluid impact during high pressure drop, low flow conditions. Furthermore, the radial compression stabilizes the annular sealing disk 128, thereby enhancing sealing between the annular sealing disk 128 and the seating surface 131 of a seat ring 126 when the control member assembly 124 is in a closed position.

The mounting member 134 includes a tubular body portion 150 having an internally extending flange 152 at a first end 154 thereof. The mounting member 134 also includes a externally extending flange 156 proximate a second end 158. The externally extending flange 156 terminates at an axially extending flange 160, which extends in an axial direction B towards the seat ring 126.

The disk holder 136 includes a tubular body portion 162 having a first end 166 and a second end 168. The tubular body portion 162 includes an annular ring 164 extending outward near the second end 168. The annular ring 164 fits into a notch 170 formed in an interior surface of the mounting member 134. The tubular body portion 162 terminates axially at the second end 168 in an axially extending lug 172.

The axially extending lug 172, the annular ring 164, the externally extending flange 156, and the axially extending flange 160 cooperate to define the annular channel 137. The annular sealing disk 128 may have a nominal radial thickness t that is slightly greater than the radial thickness T of the annular channel 137. In some embodiments, the nominal radial thickness t of the annular sealing disk 128 may be between 0.01 mm and 0.1 mm larger than the radial thickness T of the annular channel 137. As a result, when the mounting assembly 132 is assembled, the annular sealing disk 128 is compressed between the axially extending lug 172 and the axially extending flange 160, which increases friction between the annular sealing disk 128 and the disk holder 136 and the mounting member 134, thereby resulting in mechanical retention of the annular sealing disk 128 within the annular channel 137.

The mounting member 134 may be operatively connected to the tubular member 130 via an interference connection (with an optional weld), as illustrated in FIG. 2. One or more seals, such as o-rings 174 may be disposed between the mounting member 134 and the tubular member 130.

Similarly, the disk holder 136 may be operatively connected to the mounting member 134 via an interference connection (with and optional weld), as illustrated in FIG. 2. One or more seals, such as o-rings 176 may be disposed between the mounting member 134 and disk holder 136.

As illustrated in FIG. 2, the internally extending flange 152 may have a radial thickness that is approximately equal to a radial thickness of the body portion 162 of the disk holder 136. As a result, an internal bore 180 may be formed having a substantially constant diameter (with the exception of a chamfered or angled surface 182 disposed at the second end 168 of the disk holder 136).

Figure 3:
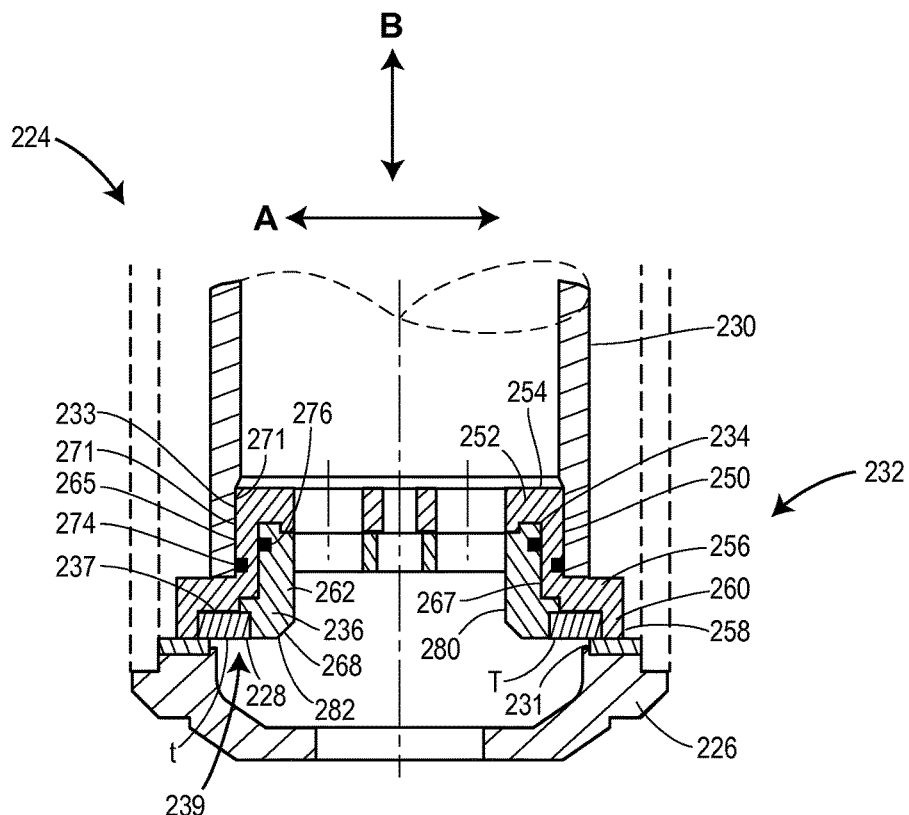
FIG. 3 is a cross-sectional side view of an alternate embodiment of a mechanical retention sealing disk mounting assembly constructed in accordance with the teachings of the disclosure.

Referring to FIG. 3, a second embodiment of a sealing disk mounting assembly 232 is operatively attached to a tubular member 230 of a control member assembly 224. The sealing disk mounting assembly 232 may be attached to the tubular member 230 by, for example, an interference fit, welds, a threaded connection, fasteners, or any other method of attaching one element to another. In the embodiment of FIG. 3, the sealing disk mounting assembly 232 may be attached to the tubular member 230 by a threaded connection 233. The sealing disk mounting assembly 232 includes a mounting member 234, which extends into a hollow bore of the tubular member 230, and a disk holder 236, which is attached to the mounting member 234 so that the mounting member is disposed between the disk holder 236 and the tubular member 230. The disk holder 236 and the mounting member 234 form a recessed annular channel 237 at a distal end 239 of the sealing disk mounting assembly 232. An annular sealing disk 228 is mechanically retained within the recessed annular channel 237.

The annular sealing disk 228 may be mechanically compressed in the radial direction A in the embodiment of FIG. 3. This radial compression prevents the annular sealing disk 228 from becoming dislodged from the disk holder 236 due to fluid impact during high pressure drop, low flow conditions. Furthermore, the radial compression stabilizes the annular sealing disk 228, thereby enhancing sealing between the annular sealing disk 228 and the seating surface 231 of the seat ring 226 when the control member assembly 224 is in a closed position.

The mounting member 234 includes a tubular body portion 250 having an internally extending flange 252 at a first end 254 thereof. The mounting member 234 also includes a externally extending flange 256 proximate a second end 258. The externally extending flange 256 terminates at an axially extending flange 260, which extends in an axial direction B towards the seat ring 226.

The disk holder 236 includes a tubular body portion 262 having a first end 266 and a second end 268. The tubular body portion 262 includes external threads 265 that cooperate with internal threads 267 on the mounting member 234 to secure the disk holder 236 to the mounting member 234.

The tubular body portion 262, the externally extending flange 256, and the axially extending flange 260 cooperate to define the annular channel 237. The annular sealing disk 228 may have a nominal radial thickness t that is slightly greater than the radial thickness T of the annular channel 237. In some embodiments, the nominal radial thickness t of the annular sealing disk 228 may be between 0.01 mm and 0.1 mm larger than the radial thickness T of the annular channel 237. As a result, when the mounting assembly 232 is assembled, the annular sealing disk 228 is compressed between the tubular body portion 262 and the axially extending flange 260, which increases friction between the annular sealing disk 228 and the disk holder 236 and the mounting member 234, thereby resulting in mechanical retention of the annular sealing disk 228 within the annular channel 237.

The mounting member 234 may be operatively connected to the tubular member 230 via a threaded connection 271, as illustrated in FIG. 3. One or more seals, such as o-rings 274 may be disposed between the mounting member 234 and the tubular member 230.

Similarly, the disk holder 236 may be operatively connected to the mounting member 234 via a threaded connection, as discussed above. One or more seals, such as o-rings 276 may be disposed between the mounting member 234 and disk holder 236.

As illustrated in FIG. 3, the internally extending flange 252 may have a radial thickness that is approximately equal to a radial thickness of the body portion 262 of the disk holder 236. As a result, an internal bore 280 may be formed having a substantially constant diameter (with the exception of a chamfered, curved, or angled surface 282 disposed at the second end 268 of the disk holder 236).

Figure 4:
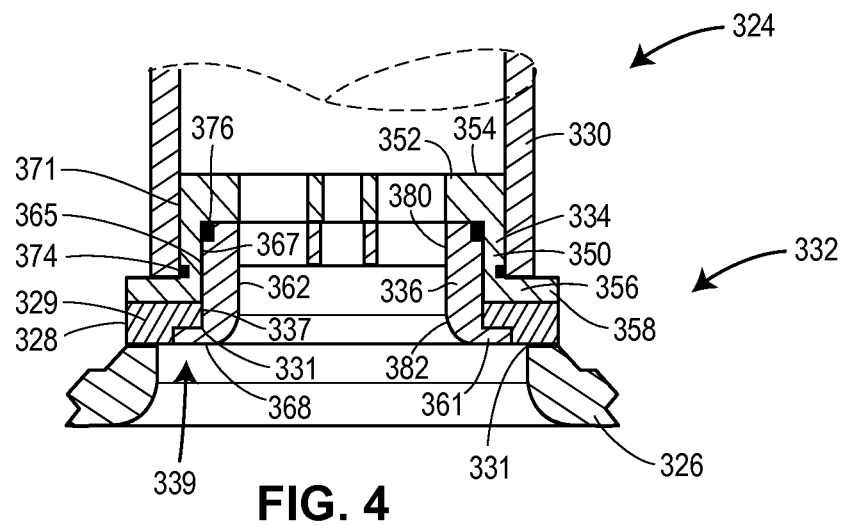
FIG. 4 is a cross-sectional side view of yet another an alternate embodiment of a mechanical retention sealing disk mounting assembly constructed in accordance with the teachings of the disclosure.

Referring to FIG. 4, a third embodiment of a sealing disk mounting assembly 332 is operatively attached to a tubular member 330 of a control member assembly 324. The sealing disk mounting assembly 332 may be attached to the tubular member 330 by, for example, an interference fit, welds, a threaded connection, fasteners, or any other method of attaching one element to another. The sealing disk mounting assembly 332 includes a mounting member 334, which extends into a hollow bore of the tubular member 330, and a disk holder 336, which is attached to the mounting member 334 so that the mounting member 334 is disposed between the disk holder 336 and the tubular member 330. The disk holder 336 and the mounting member 334 form a recessed annular channel 337 at a distal end 339 of the sealing disk mounting assembly 332. An annular sealing disk 328 is mechanically retained within the recessed annular channel 337.

The annular sealing disk 328 may be mechanically compressed in the axial direction B in the embodiment of FIG. 4. This axial compression prevents the annular sealing disk 328 from becoming dislodged from the disk holder 336 due to fluid impact during high pressure drop, low flow conditions. Furthermore, the axial compression stabilizes the annular sealing disk 328, thereby enhancing sealing between the annular sealing disk 328 and the seating surface 331 of the seat ring 326 when the control member assembly 324 is in a closed position.

The mounting member 334 includes a tubular body portion 350 having an internally extending flange 352 at a first end 354 thereof. The mounting member 334 also includes a externally extending flange 356 proximate a second end 358. The externally extending flange 256 cooperates with an externally extending flange 361 on the disk holder 336, which extends in outwardly an radial direction A.

The disk holder 336 includes a tubular body portion 362 having a first end 366 and a second end 368. The tubular body portion 362 includes external threads 365 that cooperate with internal threads 367 on the mounting member 334 to secure the disk holder 336 to the mounting member 334.

The tubular body portion 362, the externally extending flange 356, and the externally extending flange 361 cooperate to define the annular channel 337. The annular sealing disk 328 may include a first portion 329 having a first axial thickness and a second portion 331 having a second axial thickness. In some embodiments, the first axial thickness may be larger than the second axial thickness. In other embodiments, the annular sealing disk 238 may have a single thickness that is compressed between the externally extending flange 361 and the mounting member 334 to form the second thickness. As a result, when the mounting assembly 332 is assembled, the annular sealing disk 328 is compressed between the externally extending flange 361 and the externally extending flange 356, which increases friction between the annular sealing disk 328 and the disk holder 336 and the mounting member 334, thereby resulting in mechanical retention of the annular sealing disk 328 within the annular channel 337. The embodiment of FIG. 4 differs from the embodiments of FIGS. 2 and 3 in that the annular sealing disk 328 is compressed in an axial direction rather than in an radial direction.

The mounting member 334 may be operatively connected to the tubular member 330 via a threaded connection 371, as illustrated in FIG. 4. One or more seals, such as o-rings 374 may be disposed between the mounting member 334 and the tubular member 330.

Similarly, the disk holder 336 may be operatively connected to the mounting member 334 via a threaded connection, as discussed above. One or more seals, such as o-rings 376 may be disposed between the mounting member 334 and disk holder 336.

As illustrated in FIG. 4, the internally extending flange 352 may have a radial thickness that is approximately equal to a radial thickness of the body portion 362 of the disk holder 336. As a result, an internal bore 380 may be formed having a substantially constant diameter (with the exception of a chamfered, curved, or angled surface 382 disposed at the second end 368 of the disk holder 336).

Figure 5:
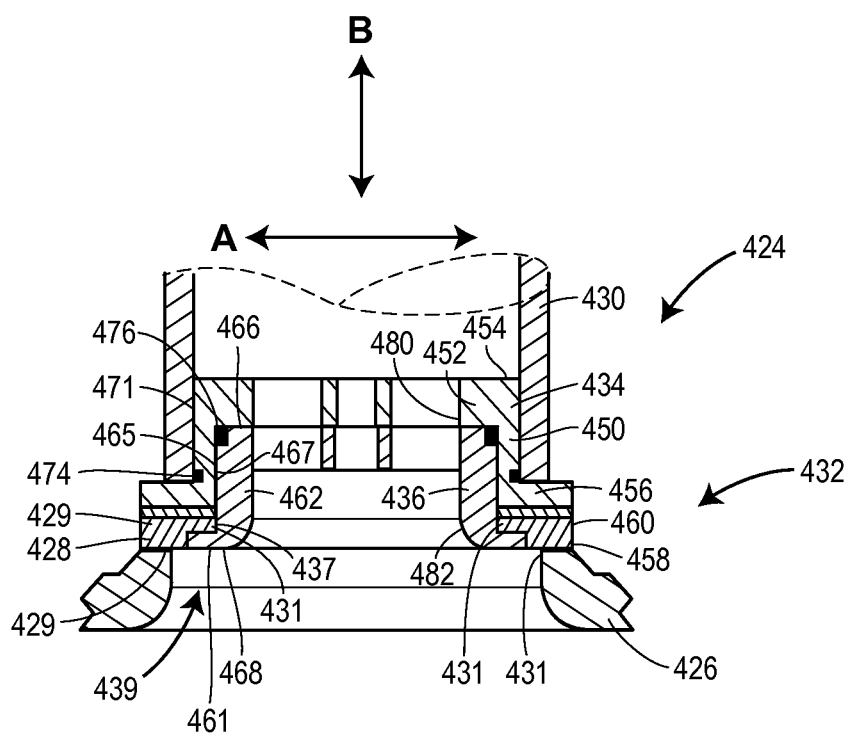
FIG. 5 is a cross-sectional side view of yet another alternate embodiment of a mechanical retention sealing disk mounting assembly constructed in accordance with the teachings of the disclosure.

Referring to FIG. 5, a fourth embodiment of a sealing disk mounting assembly 432 is operatively attached to a tubular member 430 of a control member assembly 424. The sealing disk mounting assembly 432 may be attached to the tubular member 430 by, for example, an interference fit, welds, a threaded connection, fasteners, or any other method of attaching one element to another. In the embodiment of FIG. 5, the sealing disk mounting assembly 432 may be attached to the tubular member 430 by a threaded connection. The sealing disk mounting assembly 432 includes a mounting member 434, which extends into a hollow bore of the tubular member 430, and a disk holder 436, which is attached to the mounting member 430 so that the mounting member 434 is disposed between the disk holder 436 and the tubular member 430. The disk holder 436 and the mounting member 434 form a recessed annular channel 437 at a distal end 439 of the sealing disk mounting assembly 432. An annular sealing disk 428 is mechanically retained within the recessed annular channel 437.

The annular sealing disk 428 may be mechanically compressed in both a radial direction A and in an axial direction B in the embodiment of FIG. 5. This radial and axial compression prevents the annular sealing disk 428 from becoming dislodged from the disk holder 436 due to fluid impact during high pressure drop, low flow conditions. Furthermore, the radial and axial compression stabilize the annular sealing disk 428, thereby enhancing sealing between the annular sealing disk 428 and the seating surface 431 of the seat ring 426 when the control member assembly 424 is in a closed position.

The mounting member 434 includes a tubular body portion 450 having an internally extending flange 452 at a first end 454 thereof. The mounting member 434 also includes a externally extending flange 456 proximate a second end 458. The externally extending flange 456 terminates at an axially extending flange 460. The externally extending flange 456 cooperates with an externally extending flange 461 on the disk holder 436, which extends in outwardly an radial direction A, to compress the annular sealing disk 428 in the axial direction. Similarly, a tubular body portion 426 of the disk holder 436 cooperates with the axially extending flange 460 to compress the annular sealing disk 428 in the radial direction.

The disk holder 436 includes the tubular body portion 462 having a first end 466 and a second end 468. The tubular body portion 462 includes external threads 465 that cooperate with internal threads 467 on the mounting member 434 to secure the disk holder 436 to the mounting member 434.

The tubular body portion 462, the externally extending flange 456, the axially extending flange 460, and the externally extending flange 461 cooperate to define the annular channel 437. The annular sealing disk 428 may include a first portion 429 having a first axial thickness and a second portion 431 having a second axial thickness. In some embodiments, the first axial thickness may be larger than the second axial thickness. In other embodiments, the annular sealing disk 438 may have a single thickness that is compressed between the externally extending flange 461 and the mounting member 434 to form the second thickness. As a result, when the mounting assembly 432 is assembled, the annular sealing disk 428 is compressed between the externally extending flange 461 and the externally extending flange 456, and between the tubular body portion 462 and the axially extending flange 460, which increases friction between the annular sealing disk 428 and the disk holder 436 and the mounting member 434, thereby resulting in mechanical retention of the annular sealing disk 428 within the annular channel 437. The embodiment of FIG. 5 differs from the embodiments of FIGS. 2, 3, and 4 in that the annular sealing disk 428 is compressed in both the radial direction and the axial direction rather than in either a radial direction or an axial direction.

The mounting member 434 may be operatively connected to the tubular member 430 via a threaded connection 471, as illustrated in FIG. 5. One or more seals, such as o-rings 474 may be disposed between the mounting member 434 and the tubular member 430.

Similarly, the disk holder 436 may be operatively connected to the mounting member 434 via a threaded connection, as discussed above. One or more seals, such as o-rings 476 may be disposed between the mounting member 434 and disk holder 436.

As illustrated in FIG. 5, the internally extending flange 452 may have a radial thickness that is approximately equal to a radial thickness of the body portion 462 of the disk holder 436. As a result, an internal bore 480 may be formed having a substantially constant diameter (with the exception of a chamfered, curved, or angled surface 482 disposed at the second end 468 of the disk holder 436).

In one example, the material of the annular sealing disk 228 may be polyurethane. However, one of ordinary skill in the art will understand that various other materials having properties similar to polyurethane, for example, may alternatively be used alone or in combination with polyurethane and still fall within the scope of the present disclosure.

The disclosed sealing ring mounting assembly allows a robust sealing material, such as polyurethane, to be used in severe service conditions. In particular, the mechanical retention (e.g., clamping in one or more of the radial and axial directions), allows a robust material that has poor bonding properties to be used in the regulator.

In light of the foregoing, the description of the present disclosure should be understood as merely providing examples of the present invention and, thus, variations that do not depart from the gist of the invention are intended to be within the scope of the invention.

What is claimed:

1. A sealing disk mounting assembly for a regulator, the sealing disk mounting assembly comprising:
    a mounting member that is adapted to be operatively attached to a tubular member of a control member assembly of a regulator;
    a disk holder that is operatively attached to the mounting member; and
    an annular sealing disk disposed in an annular channel that is formed between the mounting member and the disk holder,
    wherein the annular sealing disk is mechanically retained between the mounting member and the disk holder by compressive forces, the mounting member and disk holder contacting the sealing disk on three or less sides when viewed in cross-section, at least one side of the sealing disk being completely exposed, and the disk holder includes an annular ring that extends radially outward proximate a second end thereof, the annular ring fitting into a notch formed in an interior surface of the mounting member.

2. The sealing disk mounting assembly of claim 1, wherein the mounting member includes a radially inner annular flange proximate a first end thereof.

3. The sealing disk mounting assembly of claim 2, wherein the radially inner annular flange has a thickness that is approximately equal to a thickness of a body portion of the disk holder.

4. The sealing disk mounting assembly of claim 3, wherein the mounting member includes a radially external annular flange proximate a second end thereof.

5. The sealing disk mounting assembly of claim 1, wherein the annular sealing disk is compressed in a radial direction between the mounting member and the disk holder.

6. The sealing disk mounting assembly of claim 1, wherein the annular sealing disk is compressed in an axial direction between the mounting member and the disk holder.

7. The sealing disk mounting assembly of claim 1, wherein the sealing disk has a first portion having a first thickness and a second portion having a second thickness, the first thickness being greater than the second thickness.

8. The sealing disk mounting assembly of claim 4, wherein the mounting member includes an axially extending flange that extends from the radially external annular flange in an axial direction towards a valve seat.

9. The sealing disk mounting assembly of claim 1, wherein the disk holder includes a radially outward extending flange.

10. The sealing disk mounting assembly of claim 1, wherein a radial thickness of the sealing disk is greater than a radial thickness of the annular channel.

11. The sealing disk mounting assembly of claim 10, wherein the radial thickness of the sealing disk is between 0.01 mm and 0.1 mm greater than the radial thickness of the annular channel.

12. The sealing disk mounting assembly of claim 1, further comprising a seal disposed between the mounting member and the tubular member.

13. The sealing disk mounting assembly of claim 1, further comprising a seal disposed between the mounting member and the disk holder.

14. The sealing disk mounting assembly of claim 1, wherein the mounting member is operatively attached to the tubular member with a threaded connection.

15. The sealing disk mounting assembly of claim 1, wherein the mounting member is operatively attached to the disk holder with a threaded connection.

16. The sealing disk mounting assembly of claim 1, wherein the sealing disk is made of an elastomeric material.

17. The sealing disk mounting assembly of claim 1, wherein the sealing disk is made of polyurethane.

18. A control device, comprising:
    a valve body defining a flow-path for a fluid;
    a seat ring disposed within the flow-path;
    an actuator coupled to the valve body including a control assembly adapted for displacement relative to the seat ring for regulating a flow of the fluid through the flow-path; and
    the sealing disk mounting assembly of claim 1.

* * * * *